United States Patent Office 3,281,315
Patented Oct. 25, 1966

3,281,315
METHOD FOR CONTROLLING NEMATODES WITH NICKEL DIALKYLDITHIOCARBAMATES AND NICKEL PHENYLDITHIOCARBAMATE
Patricia J. Sazegar, New York, N.Y., assignor to The International Nickel Company, Inc., New York, N.Y., a corporation of Delaware
No Drawing. Filed May 25, 1964, Ser. No. 370,124
7 Claims. (Cl. 167—22)

The present invention is directed to the treatment of soil or growth media and, in particular, to a method for the control of nematodes which attack the root portions of plants.

It has become recognized in the argricultural field that nematodes are responsible for extensive damage to crops, including food crops, fiber crops, ornamentals, etc. Nematodes damage the structure of plants, including root portions, stem portions, bud portions, leaf portions, bulbs, seeds, etc., and interfere with proper development of plants such the ability of the plants growing in infested soil to provide a high yield of a desirable food or fiber crop, etc., is greatly limited and in severe cases the plant is killed. In either event, an economic loss results, which loss can be, and in many instances is, large. The problem of controlling nematodes is a complicated one. In some instances, crop failures due to nematode infestation has not even been recognized. It is, of course, necessary that any treatment of the soil to destroy or inhibit the growth of plant attacking nematodes must not itself result in inhibiting the desired vigorous plant growth.

Many solutions for the problem of controlling nematodes have been proposed but none of the proposals to date has been entirely successful.

It has now been discovered that certain nickel compounds introduced into the soil provide effective control of nematodes without exhibiting an undue phytotoxic effect.

It is an object of the present invention to provide an improved method for treating nematode-infested soil to control the nematodes.

It is a further object of the invention to provide a method for nematode control which does not produce phytotoxic effects and which does not deleteriously affect the soil.

Other objects and advantages of the invention will become apparent from the following description.

Broadly stated, the invention comprises a method for the control of nematodes which comprises introducing into nematode-infested soil a nematicidal amount of a nickel dithiocarbamate having the general structure $(R_2NCS_2)_2Ni$ wherein R is a substituent from the group consisting of alkyl groups, aryl groups and hydrogen. Satisfactory nickel dithiocarbamate compounds which may be employed in accordance with the invention include nickel di-n-hexyldithiocarbamate, nickel di-n-butyldithiocarbamate, nickel dimethyldithiocarbamate, nickel di-n-propyldithiocarbamate, nickel di-2-ethylhexyldithiocarbamate and nickel phenyldithiocarbamate. The nickel dithiocarbamates contemplated in accordance with the invention exhibit nematocidal activity when introduced in soil in amounts as low as about 0.05 part per million (p.p.m.), e.g., at least about 0.1 or 1 or 5 p.p.m. Greater amounts up to about 20 p.p.m., or higher, can be employed.

The nickel dithiocarbamates employed for nematocidal purposes have limited solubility in water and its is accordingly advantageous to introduce these compounds into infested soil in the form of a wettable powder prepared in accordance with standard procedures. The nickel dithiocarbamate may be introduced by any convenient technique such as a soil chisel.

In order to give those skilled in the art a better understanding of the invention and a better appreciation of the advantages of the invention, the following illustrative examples are given:

EXAMPLE I

The nematocidal activity of nickel di-n-propyldithiocarbamate, nickel dimethyldithiocarbamate, nickel di-n-butyldithiocarbamate, nickel di-n-hexyldithiocarbamate, nickel di-2-ethylhexyldithiocarbamate and nickel phenyldithiocarbamate, respectively, was determined against a species of Panagrellus, an active saprozoic nematode, in an aqueous medium. The nematodes were grown in a culture medium, were separated therefrom by means of the Baermann funnel technique to insure freedom from food contamination and uniformity of age and were transferred to stoppered test tubes containing 10 milliliters of the chemical dosage to be tested. In each case, the nematode population was adjusted to 50 to 75 at the time of seeding. In each case, the tests were run in duplicate and duplicate check or blank tests were conducted simultaneously in tap water. Under the conditions of test, the nematodes survive at least seven days without the addition of food. The nematodes were observed by microscope over a period of nine days to establish the rapidity of kill and the final end point of kill. Panagrellus are characterized by constant and active movement permitting easy identification of live and dead individuals. Furthermore, the species reproduces rapidly by parthenogenesis and the testing technique permits observation of the nematocides on reproductive behaviour and also upon individuals of various ages. The aforementioned nickel compounds were tested at concentrations of 1,000; 100; 10; 1 and 0.1 p.p.m. by weight of the compound tested. Results of the observations are provided in the following Table I:

TABLE I

| Chemical | Dose p.p.m. nickel | Percent Kill | | | | | |
|---|---|---|---|---|---|---|---|
| | | 1 Day | 2 Days | 3 Days | 5 Days | 7 Days | 9 Days |
| Nickel di-n-propyldithiocarbamate | 1,000 | 100 | 100 | 100 | 100 | 99 | 100 |
| | 100 | 0 | 75 | 80 | 90 | 75 | 85 |
| | 10 | 0 | 10 | 10 | 17 | 17 | 80 |
| | 1 | 0 | 5 | 5 | 10 | 15 | 75 |
| | 0.1 | 0 | 0 | 0 | 10 | 15 | 75 |
| Nickel dimethyldithiocarbamate | 1,000 | 12 | 100 | 100 | 100 | 100 | 100 |
| | 100 | 0 | 10 | 10 | 67 | 67 | 87 |
| | 10 | 0 | 0 | 0 | 10 | 10 | 75 |
| | 1 | 0 | 0 | 0 | 10 | 20 | 70 |
| | 0.1 | 0 | 0 | 0 | 5 | 10 | 70 |
| Nickel di-n-butyldithiocarbamate | 1,000 | 99 | 100 | 100 | 100 | 95 | 99 |
| | 100 | 7 | 100 | 100 | 100 | 75 | 95 |
| | 10 | 0 | 100 | 100 | 100 | 80 | 95 |
| | 1 | 0 | 92 | 90 | 90 | 60 | 87 |
| | 0.1 | 0 | 70 | 70 | 80 | 35 | 80 |
| Nickel di-n-hexyldithiocarbamate | 1,000 | 90 | 100 | 100 | 100 | 99 | 100 |
| | 100 | 10 | 100 | 100 | 100 | 92 | 99 |
| | 10 | 0 | 97 | 100 | 85 | 85 | 85 |
| | 1 | 0 | 90 | 97 | 92 | 90 | 92 |
| | 0.1 | 0 | 70 | 85 | 97 | 85 | 85 |
| Nickel di-2-ethyl hexyldithiocarbamate | 1,000 | 10 | 100 | 100 | 100 | 100 | 100 |
| | 100 | 0 | 92 | 97 | 90 | 60 | 92 |
| | 10 | 0 | 47 | 50 | 25 | 20 | 90 |
| | 1 | 0 | 20 | 25 | 20 | 20 | 75 |
| | 0.1 | 0 | 7 | 10 | 7 | 7 | 70 |
| Nickel p henyldithiocarbamate | 1,000 | 100 | 100 | 100 | 100 | 100 | 100 |
| | 100 | 100 | 90 | 100 | 100 | 100 | 100 |
| | 10 | 0 | 10 | 15 | 15 | 25 | 75 |
| | 1 | 0 | 0 | 0 | 0 | 10 | 50 |
| | 0.1 | 0 | 0 | 0 | 0 | 10 | 45 |
| Untreated check | | 0 | 0 | 5 | 5 | 10 | 15 |

The activity displayed by nickel di-n-butyldithiocarbamate and nickel di-n-hexyldithiocarbamate appeared to demonstrate special significance for these compounds.

EXAMPLE II

Nickel di-n-hexyldithiocarbamate was prepared as a 50% wettable powder by mixture with a preparation containing 92% "Hi Sil 233" synthetic silica pigment, about 4% "Marasperse N" anionic surfactant (sodium ligno sulfate), and about 4% "Pluronic L 61" non ionic surfactant (polyoxyethylene condensate with polyoxypropylglycol). The 50% wettable powder preparation was further extended to a 10% dust preparation with Continental clay. One part by weight of soil heavily infested with root knot nematode (*Meliodogyna hapla*) embedded in tomato root tissue was mixed with eight parts of ordinary potting soil. The resulting mixture of infested soil was then cured for two weeks to permit larval hatching of the nematode and to permit escape of all individuals from the original tomato root tissue employed in the culture preparation. During the curing process, the soil was thoroughly turned over every other day to obtain a highly uniform and homogenous mixture of infested soil. One kilogram lots of the soil were mixed with the prepared nematocide in amounts corresponding to 37.5, 75 and 150 pounds of the nickel compound per acre by means of tumbling. The soil mixture was retained in a closed condition for 48 hours. The treated soil was then placed in pots and stored for an additional five days. At the end of this period, half of the pots was planted with tomato seedlings and the other half of the pots was planted with beet seed. Check pots of infested soil which did not contain the nickel compound and additional check pots which had been treated with equivalent weight percentages of commercial nematocides (1,2 - dibromo 3-chloropropane and a mixture of 1,3-dichloropropene and 1,2-dichloropropane) were also prepared in an identical manner.

The plants were observed regularly for a period of four to six weeks. At the end of this time, it was seen that the plants growing in untreated soil were very seriously damaged as a result of nematode invasion. Examination of the plants when removed from the pots revealed that practically no root system was present. On the other hand, the plants growing in soil treated with the nickel dithiocarbamate compound exhibited vigorous growth with little evidence of phytotoxicity attributable to the compound. Examination of the roots of the plants for nematode invasion further demonstrated that the plants had been protected from nematode invasion to a superior extent as compared to the plant growing in soil treated with either of the commercial nematocides.

EXAMPLE III

A field trial in a slightly acid sandy slit loam river bed cumulation soil known to be heavily infested with root knot nematodes from year to year was conducted using nickel di-n-butyldithiocarbamate and the two commercial nematocides discussed in Example II. Each chemical was tested at 150, 75 and 37.5 pounds of active ingredient per acre. All plots were in duplicate and all rows were a minimum of 500 feet in length. The nickle compound was formulated as a 25% wettable powder in the manner described in Example II, and the commercial nematocides were applied as recommended by the manufacturer. Two days prior to soil treatment, about one and one-half inches of water was supplied by overhead irrigation to bring the soil moisture content up to a suitable level. Materials were suspended in water and injected continuously into the soil to a depth of six inches by means of a soil chisel. The packing wheel immediately behind the chisel injector effectively covered and lightly packed the soil immediately after injection. One week after the soil treatment, the soil was planted to cucumber, turnip and beet. Soil temperature was about 70° F. at the time of treatment and also at the time of planting the index crop. Irrigation of the area was required during the growing season since the growing season involved was dry. Crops in each case were observed for seedling emergence and for growth of the emergent plants over a period of months. It was observed that a heavy infestation of root knot nematode developed in the untreated soil during the growing season. In order to check the extent of nematode invasion, 30 to 40 mature individual plants were carefully lifted from the soil. Adhering soil was carefully removed and the available root system was then carefully examined for the extent and degree of nematode galls. The infestation of individual plants was scored on a system of zero to 5 with zero indicating no root galls and 5 indicating very heavy nematode attack. A total scoring or rating of all the plants examined was accumulated and this, in turn, divided by the total maxium infection and referred to a basis of 100 as a maximum total infection rating to obtain a "Root Knot Index." The following Table II contains the results of the tests, including the "Root Knot Index" obtained:

media used for the purpose of nourishing and supporting plant growth.

It is generally considered that one acre of average soil to a cultivatable six-inch depth will weigh about two million pounds. On this basis, one pound of nickel per acre would be approximately 0.5 part per million. Accordingly, the application of 37.5, 75 and 150 pounds per acre of the nickel di-n-butyldithiocarbamate represented an addition of approximately 2.35, 4.7 and 9.4 parts per million of nickel per acre, respectively.

It is known that nematodes occur in rather sporadic areas or pockets in an infested field. It was for this reason that duplicate check plots, which were untreated with any nematocide, were set aside for observation along with the treated plots as described hereinbefore. It is to

TABLE II

| Crop | Chemical | Dose, pounds per acre | Percent of Plants Infected | Root Knot Index |
|---|---|---|---|---|
| Turnips | Nickel di-n-butyldithiocarbamate | 150 | 7 | 1.4 |
|  |  | 75 | 10 | 2 |
|  |  | 37.5 | 72 | 40 |
|  | Untreated check |  | 85 | 42 |
|  | 1,2-dibromo and 3-chloropropane | 37.5 | 73 | 40 |
|  | Untreated check |  | 53 | 44.8 |
| Beets | Nickel di-n-butyldithiocarbamate | 150 | 20 | 13 |
|  |  | 75 | 41 | 16.5 |
|  |  | 37.5 | 15 | 12.5 |
|  | Untreated check |  | 83 | 46 |
|  | 1,2-dibromo and 3-chloropropane | 75 | 27 | 23.2 |
|  | Untreated check |  | 78 | 49 |
| Cucumbers | Nickel di-n-butyldithiocarbamate | 150 | 0 | 0 |
|  |  | 75 | 27 | 13.5 |
|  |  | 37.5 | 0 | 0 |
|  | Untreated check |  | 100 | 77.5 |
|  | 1,2-dibromo and 3-chloropropane | 150 | 67 | 16 |
|  |  | 75 | 67 | 17.5 |
|  |  | 37.5 | 53 | 24 |
|  | 1,3-dichloropropene and 1,2-dichloropropane. | 150 | 27 | 5.3 |
|  |  | 75 | 46 | 10 |
|  |  | 37.5 | 53 | 10.7 |
|  | Untreated check |  | 60 | 18.7 |

In all cases, it was noted that there is no adverse effect on the germination or stand of the seedlings due to the treatment with the nickel dithiocarbamate. In addition, it was noted that in the cucumber crop which was harvested daily for market upon maturity (whereas the other crops were left in the ground until Fall), a marked improvement in yield was obtained which was attributable to the control of the root knot nematode.

In all cases, superior results were obtained using nickel di-n-butyldithiocarbamate than with the commercial halogenated hydrocarbon nematocides.

It will be appreciated that the nematocide contemplated in accordance with the invention can be applied in a suitable form such as a wettable powder or can be mixed with other soil treating agents, including fertilizers and the like. Most advantageously, it is simply applied to the soil surface per se and plowed into the soil at the time the soil is prepared for planting. This advantageous method reduces to a minimum the cost of application. In Example III given hereinbefore, the soil chisel technique was employed since this is the standard method for applying the conventional volatile halogenated hydrocarbon nematocides which were also tested for check purposes. The nickel dithiocarbamates contemplated as a nematocide in accordance with the invention have been demonstrated to be effective as nematocides without producing plant damage when used in the concentrations set forth herein.

It will be appreciated that the word "soil" as employed herein is a term of broad application applied to growth be appreciated that field testing of this sort is empirical in nature since practical conditions, including the fact that the nematodes do not occur uniformly throughout a field, are encountered.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for the control of nematodes which comprises introducing into nematode-infested soil a nematocidal amount of a compound from the group consisting of nickel di-n-hexyldithiocarbamate, nickel di-n-butyldithiocarbamate, nickel dimethyldithiocarbamate, nickel di-n-propyldithiocarbamate, nickel di-2-ethylhexyldithiocarbamate, and nickel phenyldithiocarbamate.

2. A method for the control of nematodes which comprises introducing into nematode-infested soil a nematocidal amount of nickel di-n-hexyldithiocarbamate.

3. A method for the control of nematodes which comprises introducing into nematode-infested soil a nematocidal amount of nickel di-n-butyldithiocarbamate.

4. A method for the control of nematodes which comprises introducing into nematode-infested soil a nematocidal amount of nickel dimethyldithiocarbamate.

5. A method for the control of nematodes which comprises introducing into nematode-infested soil a nematocidal amount of nickel di-n-propyldithiocarbamate.

6. A method for the iontrol of nematodes which comprises introducing into nematode-infested soil a nematocidal amount of nickel di-2-ethylhexyldithiocarbamate.

7. A method for the control of nematodes which comprises introducing into nematode-infested soil a nematocidal amount of nickel phenyldithiocarbamate.

References Cited by the Examiner

UNITED STATES PATENTS

| | | | |
|---|---|---|---|
| 2,766,554 | 10/1956 | Dorman et al. | 167—22 X |
| 2,805,996 | 9/1957 | Deger | 167—22 X |
| 3,073,694 | 1/1963 | Hyson | 167—22 X |

JULIAN S. LEVITT, *Primary Examiner.*

V. C. CLARKE, *Assistant Examiner.*